Nov. 28, 1933.     A. E. MAIBAUER     1,937,490
ELECTRIC CONDENSER
Filed July 9, 1931
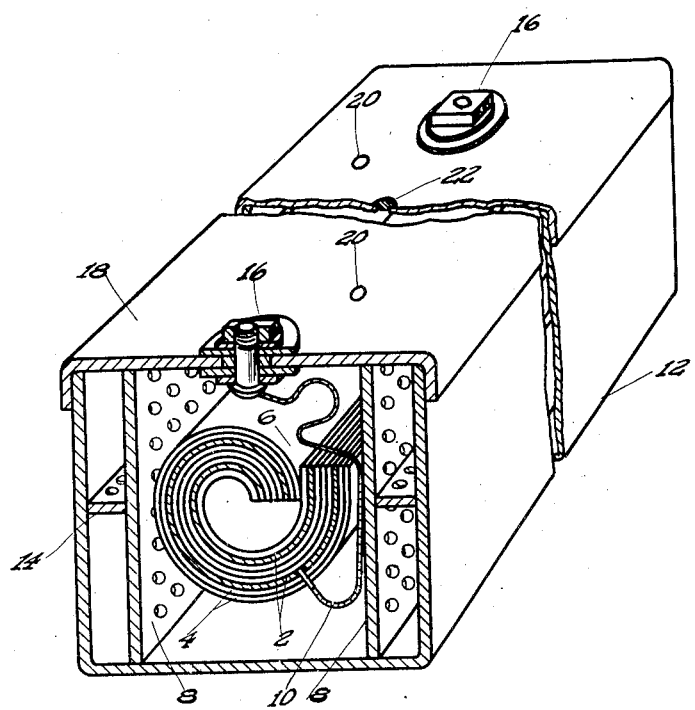
INVENTOR.
Albert E. Maibauer
BY
ATTORNEYS.

Patented Nov. 28, 1933

1,937,490

UNITED STATES PATENT OFFICE 1,937,490

ELECTRIC CONDENSER

Albert E. Maibauer, Bloomfield, N. J., assignor to Halowax Corporation, New York, N. Y., a corporation of Delaware Application July 9, 1931. Serial No. 549,655

7 Claims. (Cl. 175—41)

This invention relates to a so-called "oil condenser" as well as to an impregnating, insulating and dielectric material for use therein.

Condensers of this type have usually been made with petroleum oils filling the space between the condenser body and the container, and impregnating the body. Such petroleum oils are by no means ideal liquids for this use because they have a higher viscosity than the materials which are hereinafter disclosed and have a lower heat conductivity and also a lower dielectric constant.

The hereinafter disclosed impregnating materials when used in condensers have a very low power factor thereby absorbing very little power and they also have high insulating resistance so that there is very little leakage current passing between the electrode elements of the condenser. The materials also have a low viscosity and high heat conductivity, and for this reason they are very mobile within the condenser jacket or container and very thoroughly and quickly dissipate the heat generated in the condenser, by quickly absorbing the heat from the condenser body and then moving to the condenser jacket where the heat is given up. The materials have a very low volatility and therefore very little of the materials are lost when they are heated in an impregnation chamber to impregnate the condenser body; and after the condenser container is sealed, they generate substantially no pressure within the container, thereby overcoming all dangers of bursting the container or injuring the condenser body even though light weight parts are used. A condenser impregnated with these materials has approximately 50 per cent greater capacitance for the same active foil or plate electrode area than has a condenser impregnated with the usual petroleum oils. Other objects and features of the invention will more fully appear from the following claims taken in conjunction with the accompanying specification and drawing which, however, must be understood as illustrating merely one form of the invention and in no way limiting it to the specific embodiment shown and described.

The single figure of the drawing is a diagrammatic sectional view of one form of condenser in conjunction with which the hereinafter described impregnating materials may be used.

The so-called oil condensers are principally used on alternating current circuits where dielectric losses are much greater than in direct current circuits. Condensers impregnated with the hereinafter described liquid oily materials are generally better than the solid wax impregnated condensers because there is less likelihood of their breaking down, they can operate at larger loads, there are less electrical losses, and a reduced corona effect. The oil which is used in the condensers should quickly absorb and dissipate any heat which is generated and, in particular, should thoroughly protect the weakest parts of the condenser that is the points at which a breakdown is most likely to occur, by absorbing the heat caused by leakage of the electric current across the weak place and then dissipating this heat. The oil should at all times be ready to seep into and insulate any weak place and should not deteriorate due to the heat or due to the excessive passage of current between the electrode elements of the condenser at the weak points. The oil should not only retain its own advantageous dielectric and resistance characteristics but it should not generate chemicals (such as acids or water) which might harm the condenser either electrically or chemically. The oils should have high electrical resistance and should also have excellent dielectric properties so that they both prevent the passage of electricity by conductivity from one of the electrode elements to another, and provide a condenser which has an exceedingly high capacitance for the electrode area. The low viscosity of the materials not only enables them to move freely within the condenser jacket so as to dissipate heat but it also enables them to thoroughly impregnate the entire body of the condenser, which they are at all times ready to do because their physical characteristics do not change upon extended use nor are they affected by such heat as is generated within the condenser nor are they affected either by the voltage which is on the condenser or by the electricity which may pass between the condenser electrodes. The materials not only have a low volatility at high temperatures but they remain liquid at low temperatures, that is at temperatures substantially below 0° C., and the viscosity is not appreciably affected by changes in temperature.

The materials which have all of these desirable characteristics to a marked degree, are liquid halogenated phenyl ether, halogenated phenanthrene, their halogenated liquid hydroxy derivatives and the liquid halogenated hydroxy derivatives of diphenyl. It is noted that these materials have the general characteristic of containing two or three cyclic groups which are joined together so as to be as nearly as possible in the form of a chain and it appears that the more nearly they are in the form of a chain with a greater distances between the cyclic groups, the better they are for use in condensers. Tests have shown that phenyl-ether has the most desirable characteristics because when chlorinated or brominated it can take a quantity of the halogen corresponding to the replacement of from two to six (inclusive) atoms of hydrogen and yet remain a readily mobile liquid with excellent dielectric properties. Halogenated hydroxy derivatives of diphenyl having properties substantially like phenyl-ether and can be halogenated to the extent of replacing from three to six of their hydrogen atoms with halogen atoms while remaining liquid. Phenanthrene may be halogenated to the extent of replacing three of its hydrogen atoms with halogen atoms while remaining liquid. These compounds will remain liquid below 0° C. and will be substantially non-volatile at 90° C., and their properties are more desirable than the liquid chlorinated naphthalenes in which the carbon rings are supposed to be joined at their long sides.

In making a condenser using these materials, the electrode elements 2, and the insulating elements 4, are assembled in their proper position to form a condenser body 6, which is held in assembled relation by clamps 8. Lead wires 10, are connected to the conducting electrode elements 2, and then brought out of the condenser body 6. The condenser body is then placed within a container 12, and held in place by spacers 14. The lead wires 10, are connected to contacts 16, which are insulated from and fastened into the top 18, of the condenser. The top of the condenser is provided with openings 20, which are to be closed by solder or similar material 22, after the condenser is filled with the impregnating material.

After the condenser body is within the container and the top is sealed in place but with the openings 20, unsealed, the entire unit is placed within the chamber of an impregnating apparatus where the unit is heated and subjected to vacuum. The heat and vacuum take all of the air and moisture from the condenser which, preferably without breaking the vacuum, is then impregnated with one, or a mixture of, the previously mentioned insulating materials. The insulating materials not only impregnate the body of the condenser but fill the container. When the condenser body is thoroughly impregnated, the unit is removed from the impregnating chamber and preferably while still hot, the openings 20, are sealed with the sealing material 22.

The resulting condenser unit is one which will last longer than a unit impregnated with a solid dielectric and it has a much higher capacity for a corresponding electrode area, than a condenser impregnated with a petroleum oil, these advantages being derived by the impregnation of the condenser body and filling the container with the previously mentioned impregnating and insulating materials having the aforesaid characteristics.

From the foregoing description it is obvious that many different impregnating materials and combinations thereof may be used and that various other modifications of the invention may be made and, although a particular form of the invention has been described, it is recognized that these modifications are possible. It is therefore desired that the invention be construed as broadly as the claims, taken in conjunction with the prior art, may allow.

I claim:

1. An electrical condenser including a body of assembled insulating elements and electrode elements impregnated with a dielectric of at least one of the group comprising a halogenated phenyl ether, halogenated phenanthrene, liquid halogenated hydroxy derivatives thereof and liquid hydroxy derivatives of halogenated diphenyl.

2. An electrical condenser including a body of assembled insulating elements and electrode elements, impregnated with a dielectric of at least one of the group comprising a chlorinated phenyl ether, chlorinated phenanthrene, liquid chlorinated hydroxy derivatives thereof and liquid hydroxy derivatives of chlorinated diphenyl.

3. An electrical condenser including a body of assembled insulating elements and electrode elements, impregnated with a dielectric of at least one of the group comprising a halogenated phenyl ether, halogenated phenanthrene, liquid halogenated hydroxy derivatives thereof and liquid hydroxy derivatives of halogenated diphenyl, containing halogen equivalent to from two to six halogen atoms per molecule.

4. An electrical condenser including a body of assembled insulating elements and electrode elements, impregnated with a dielectric of at least one of the group comprising a chlorinated phenyl ether, chlorinated phenanthrene, liquid chlorinated hydroxy derivatives thereof and liquid hydroxy derivatives of chlorinated diphenyl containing chlorine equivalent to from two to six chlorine atoms per molecule.

5. An electrical condenser unit including a container and within the container a body of assembled insulating elements and electrode elements impregnated with a dielectric of at least one of the group comprising a halogenated phenyl ether, halogenated phenanthrene, liquid halogenated hydroxy derivatives thereof and liquid hydroxy derivatives of halogenated diphenyl.

6. A liquid dielectric for use in electrical devices including at least one of the group of materials comprising a halogenated phenyl ether, halogenated phenanthrene, liquid halogenated hydroxy derivatives thereof and liquid hydroxy derivatives of halogenated diphenyl.

7. A liquid dielectric for use in electrical devices including at least one of the group of materials comprising a chlorinated phenyl ether, chlorinated phenanthrene, liquid chlorinated hydroxy derivatives thereof and liquid hydroxy derivatives of chlorinated diphenyl.

ALBERT E. MAIBAUER.

DISCLAIMER 1,937,490.—*Albert E. Maibauer*, Bloomfield, N. J. ELECTRIC CONDENSER. Patent dated November 28, 1933. Disclaimer filed December 27, 1935, by the assignee, *Halowax Corporation*.

Hereby enters this disclaimer to chlorinated phenyl ether from the scope of claims 1 to 7, inclusive, of said patent.

[*Official Gazette January 21, 1936.*]